United States Patent [19]

Zeeman

[11] Patent Number: 4,763,035
[45] Date of Patent: Aug. 9, 1988

[54] INDUCTIVE WINDING FOR FLAT MOTOR

[75] Inventor: Leendert Zeeman, Dordrecht, Netherlands

[73] Assignee: U.S. Philips Corporation, New York, N.Y.

[21] Appl. No.: 119,006

[22] Filed: Nov. 10, 1987

[30] Foreign Application Priority Data

Nov. 20, 1986 [NL] Netherlands .................. 8602948

[51] Int. Cl.$^4$ .................. H01F 5/00; H02K 3/26
[52] U.S. Cl. .................. 310/208; 29/835; 310/DIG. 6; 336/200; 361/400
[58] Field of Search .................. 29/829, 835; 310/42, 310/208, DIG. 6; 336/200, 225; 361/248, 397, 400

[56] References Cited

U.S. PATENT DOCUMENTS

| | | | |
|---|---|---|---|
| 2,014,524 | 9/1935 | Franz | 336/200 |
| 2,874,360 | 2/1959 | Eisler | 336/200 |
| 2,911,605 | 11/1959 | Wales, Jr. | 336/200 |
| 2,961,747 | 11/1960 | Lyman | 336/200 |
| 4,621,231 | 11/1986 | Heinrich et al. | 336/225 |
| 4,651,254 | 3/1987 | Brede et al. | 361/248 |

FOREIGN PATENT DOCUMENTS 1376322 9/1964 France .................. 310/DIG. 6

*Primary Examiner*—Patrick R. Salce
*Assistant Examiner*—D. L. Rebsch
*Attorney, Agent, or Firm*—F. Brice Faller

[57] ABSTRACT

A strip of electrically insulating foil (15) is subdivided into successive foil parts (23) separated by folding lines (21) and folded against each other along the folding lines. Each foil part has on one of its major surfaces a conductor track (25) which forms a curved meander-like line extending in a number of pole-forming curves (33) connected by connection members (31). The conductor tracks (25) on the foil parts (23) are connected together by connection tracks (27). The curves (33) cooperate with the connection tracks (27) and the connection members (31) to form coils arranged in a circle. The winding is particularly suitable as a stator winding for a flat direct current motor. The winding can be manufactured without loss of material in that the long sides of the foil strip (15) are crenellated so that the strip comprises a succession of wide (17) and narrow (19) rectangles, the folding lines (21), viewed in the longitudinal direction of the strip, extending alternately from one long side of the strip to the other, and conversely. Each folding line extends from a corner point of a narrow rectangle present on one of the long sides to a corner point of the next narrow rectangle present on the oppositely located long side so that the foil parts (23) have the form of parts of an octagon having a central aperture (35).

1 Claim, 2 Drawing Sheets

INDUCTIVE WINDING FOR FLAT MOTOR

BACKGROUND OF THE INVENTION

The invention relates to an inductive winding suitable for use in a flat electric motor. A strip of an electrically insulating foil is subdivided into successive foil parts which are separated by folding lines and folded against each other along the folding lines. Each foil part has on at least one of its major surfaces an electrically conductive track which extends according to a curved line around an axis which is perpendicular to the major surfaces of the foil parts. The conductor tracks are electrically connected together by means of connection tracks, the curved lines followed by the conductor tracks on the foil parts being meander-like with a number of curves connected by connection members. The curves cooperate with the connection tracks and the connection members to form coils arranged in a circle around the axis.

Such a winding is known from FR-A No. 1 376 322. The known winding may comprise a large number of turns formed by cooperation of the conductor tracks and connected together by the connection tracks. The conductor tracks and the connection tracks are provided in one operation in a manner conventionaly used in the manufacture of printed circuits, and connections between parts of the winding need not be made afterwards by soldering or a similar operation. The winding can therefore be manufactured easily and at low cost.

The rotor or the stator of a flat electric motor generally has the form of an approximately circular disc having a central aperture. The known method of manufacturing windings from a foil with conductor tracks has the drawback that before or after folding the shape of the packet has to be adapted by cutting away the corners and punching the central part. These are extra operations which in addition produce loss of material. It is an object of the invention to provide a winding of the kind set forth which can be manufactured substantially without loss of material and without any extra aftertreatments. To achieve this, the winding in accordance with the invention is characterized in that the long sides of the foil strip are crenellated so that the strip comprises a succession of wide and narrow rectangles and that the folding lines, viewed in the longitudinal direction of the strip, extend alternately from one long side of the strip to the other, and conversely, each folding line extending from a corner point of a narrow rectangle present on one of the long sides to a corner point of the next narrow rectangle present on the oppositely located long side so that the foil parts have the form of parts of an octagon having a central aperture. This winding has an octagonal outer circumference and a square aperture in the center, with which the desired shape proves to have been approached sufficiently for practical purposes.

DETAILED DESCRIPTION OF THE PREFERRED EMBODIMENT

Figure 1A:
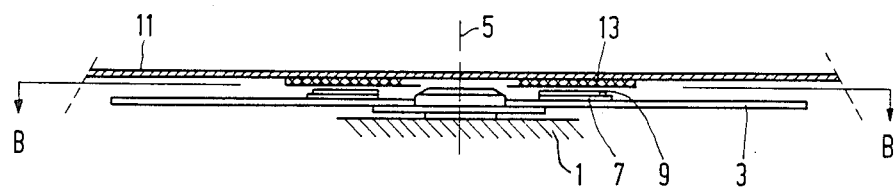
FIG. 1A is a diagrammatic cross-sectional view of a flat, brushless direct current motor.
Figure 1B:
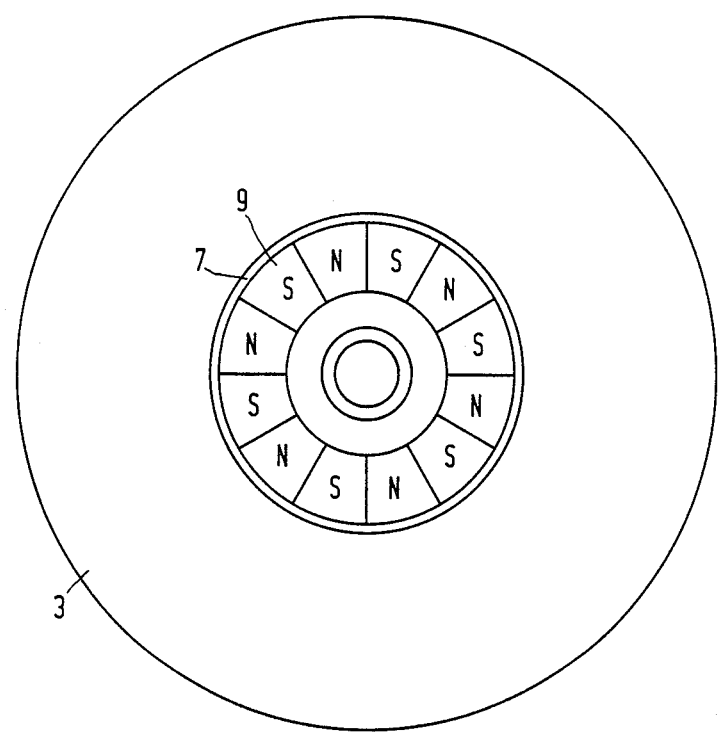
FIG. 1B is a plan view of the rotor vane taken along line B—B of FIG. 1A.

Referring to FIGS. 1A and 1B, rotor vane 3 is journalled on a shaft 5 so as to be rotatable on a chassis 1. A rotor closing plate 7 of a soft magnetic material is connected on the rotor vane 3 and twelve permanent magnets 9 are placed on it in a circle around the axis 5, the north and south poles of which are alternately directed upwards. Said magnets may be formed by magnetizing a ferrite disc so as to be multipolar. A stator closing plate 11 is connected, in a manner not shown, to the chassis 1 above the rotor vane 3 and on its side facing the rotor vane it bears a stator winding 13 having stator coils arranged in a circle around the axis 5 opposite to the permanent magnets 9.

Figure 2:
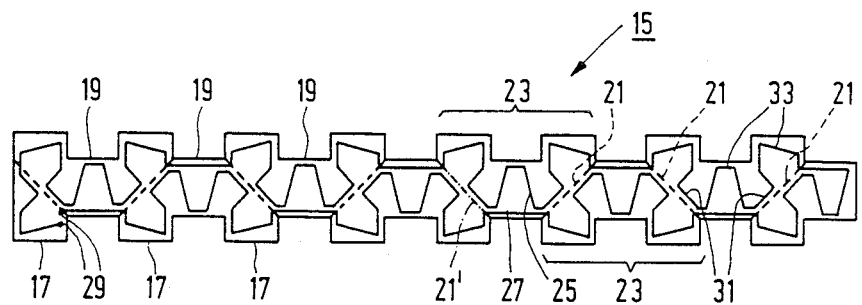
FIG. 2 is an elevation of a strip of insulating foil with conductor tracks from which the stator winding for the motor shown in FIG. 1 has been folded.

The stator winding 13 is folded from a strip of foil 15 of an electrically insulating material, for example capton, of which an example is shown in FIG. 2. The sides of the strip 15 have a crenellated profile so that the strip consists of a succession of wide rectangles 17 and narrow rectangles 19. In the example shown the narrow rectangles 19 are squares and the wide rectangles 17 have short sides which are approximately equal to the sides of the narrow rectangles and long sides which are approximately twice as long. The wide rectangles 17 extend with their longer sides perpendicularly to the longitudinal direction of the strip 15.

The strip 15 is subdivided into successive foil parts 23 separated by folding lines 21 (shown in broken lines). The folding lines 21, viewed in the longitudinal direction of the strip 15, extend alternately from the left long side of the strip to the right long side, and conversely. Each folding line extends from a corner point of a narrow rectangle 19 situated on a long side of the strip to a corner point of the next narrow rectangle situation on the oppositely located long side of the strip. The result of this path followed by the folding lines is that the foil parts 23 have the form of a part of an octagon having a square central aperture. Most foil parts 23 in the example shown in FIG. 2 correspond to half an octagon, the first and the last foil part being smaller and together constituting half an octagon.

Each foil part 23 is provided with an electrically conductive track 25 on at least one of its major surfaces (the plane of the drawing in FIG. 2). The conductor tracks 25 are connected together by means of connection tracks 27 so that the conductor tracks and the connection tracks together constitute an uninterrupted tracm which extends between two connection points 29. The tracks are formed in a manner conventionally used in the manufacture of panels with surface winding, for example, by selectively etching a layer of copper provided on the said major surface of the foil. On the other major surface, not visible in the Figure, a similar pattern of tracks may be provided.

Figure 3:
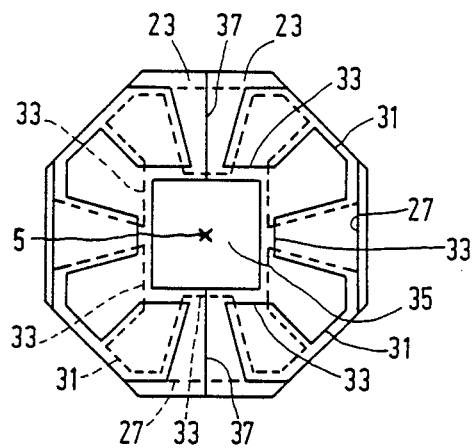
FIG. 3 is an elevation of the stator winding used in the motor shown in FIG. 1 after folding.

Each conductor track 25 on a foil part 23 extends according to a curved line. The curved lines themselves followed by the conductor tracks 25 are meander-like and have a number of curves 23 connected by connection members 31. After folding the strip 15 the curves 33 cooperate with the connection tracks 27 and the connection members 31 so as to form coils. For this purpose, the strip 15 is folded along the folding lines 21 so that the foil parts 23 flatly engage each other. Folding is done, for example, so that the extreme right foil part 23 in FIG. 2 is bent downwards out of the plane of the drawing along the right hand folding line 21 until it engages the lower side of the second foil part from the right, after which the packet of foil parts thus formed is folded along the second folding line from the right in the same manner against the said foil part. This manner of folding is continued until the folding line 21' indicated by a dot-and-dash line is reached. The packet which is now situated on the right of said folding line is folded upwards out of the plane of the drawing until it engages the top of the adjacent foil part 23 (the fifth from the right). The foil packet is then again folded downwards along the successive broken line folding lines 21 until the whole strip 15 has been folded. The packet thus formed, as is shown in FIG. 3, has the shape of an octagon having a square aperture 35 in the center. The axis 5 (see also Figure 1A) extends at right angles to the major surfaces of the foil parts 23 through the center of aperture 35. The conductor tracks 25 are curved around the axis. On the side of said package shown in FIG. 3 the two top foil parts 23 are visible in the form of half an octagon; then engage each other according to lines indicated by 37. The connection tracks 27 as well as the curves 33 and connection members 31 of the conductor tracks 25 are visible on the foil parts. The corresponding tracks on the foil parts immediately engaging the two top foil parts 23 are indicated in the Figure by broken lines. As a result, each curve 33, together with a connection track 27 on the same foil part 23 or together with a connection member 31 on an underlying foil part, surrounds a closed area. In this manner, all the curves 33 situated one on top of the other in the direction of the axis 5 and associated connection tracks 27 and connection member 31, respectively, cooperate to form an electric coil. The twelve coils thus formed are arranged in a circle around the axis 5. When corresponding conductor tracks and connection tracks are provided on the major surface of the coil strip 15, not shown in FIG. 2, a second circle of twelve coils is formed to which a current can be applied which is shifted in pahse with respect to the current through the first-mentioned coils which is applied via the connections 29. Upon folding the strip 15 the conductor tracks and connection tracks which will become located one against the other must, of course, be kept separated from each other electrically, for example, by interposing insulating foils, or in that the surfaces of the strip covered with conductors have previously been covered with an insulating layer.

Figure 4:
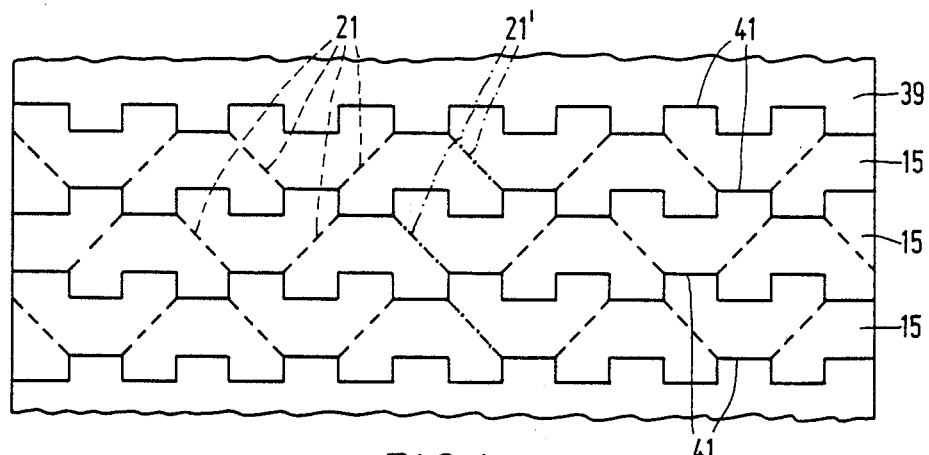
FIG. 4 shows a part of a sheet of foil from which a number of strips shown in FIG. 2 can be manufactured.

The form of the foil strip 15 has been chosen so that a great number of these strips can be cut loss-free from a sheet 39 (see FIG. 4) on which the desired patterns of conductor tracks have previously been provided. FIG. 4 shows the cutting lines 41 which form the long sides of the strips 15, as well as the folding lines 21 and 21'. Since the strips 15 are situated alternately in the sheet 39, no losses occur during cutting. As has become apparent from the description with reference to FIGS. 2 and 3, no losses occur either, in folding the strip 15 to form a stator winding, so that the described stator winding can be manufactured in a simple manner and at comparatively low cost.

What is claimed is:

1. An inductive winding comprising a strip of an electrically insulating foil which is subdivided into successive foil parts which are separated by folding lines and which are folded against each other along the folding lines and each of which comprises on at least one of its major surfaces an electrically conductive track which extends according to a curved line around an axis which is perpendicular to the major surfaces of the foil parts, said conductor tracks being connected electrically together by means of connection tracks, the curved lines followed by the conductor tracks on the foil parts being meander-like with a number of curves connected by connection members, the curves cooperating with the connection tracks and the connection members so as to form coils arranged in a circle around the axis, characterized in that the long sides of the foil strip are crenellated so that the strip comprises a succession of wide and narrow rectangles and that the folding lines, viewed in the longitudinal direction of the strip, extend alternately from one long side of the strip to the other, each folding line extending from a corner point of a narrow rectangle present on one of the long sides to a corner point of the next narrow rectangle present on the oppositely located long side so that the foil parts have the form of parts of an octagon having a central aperture.

* * * * *